C. J. STARKS.
BALING PRESS.
APPLICATION FILED JUNE 13, 1916.

1,223,211.

Patented Apr. 17, 1917.
5 SHEETS—SHEET 1.

Inventor
C. J. Starks
By Victor J. Evans
Attorney

Witnesses
H. H. Lybrand
J. Wilcox

C. J. STARKS.
BALING PRESS.
APPLICATION FILED JUNE 13, 1916.

1,223,211.

Patented Apr. 17, 1917.
5 SHEETS—SHEET 2.

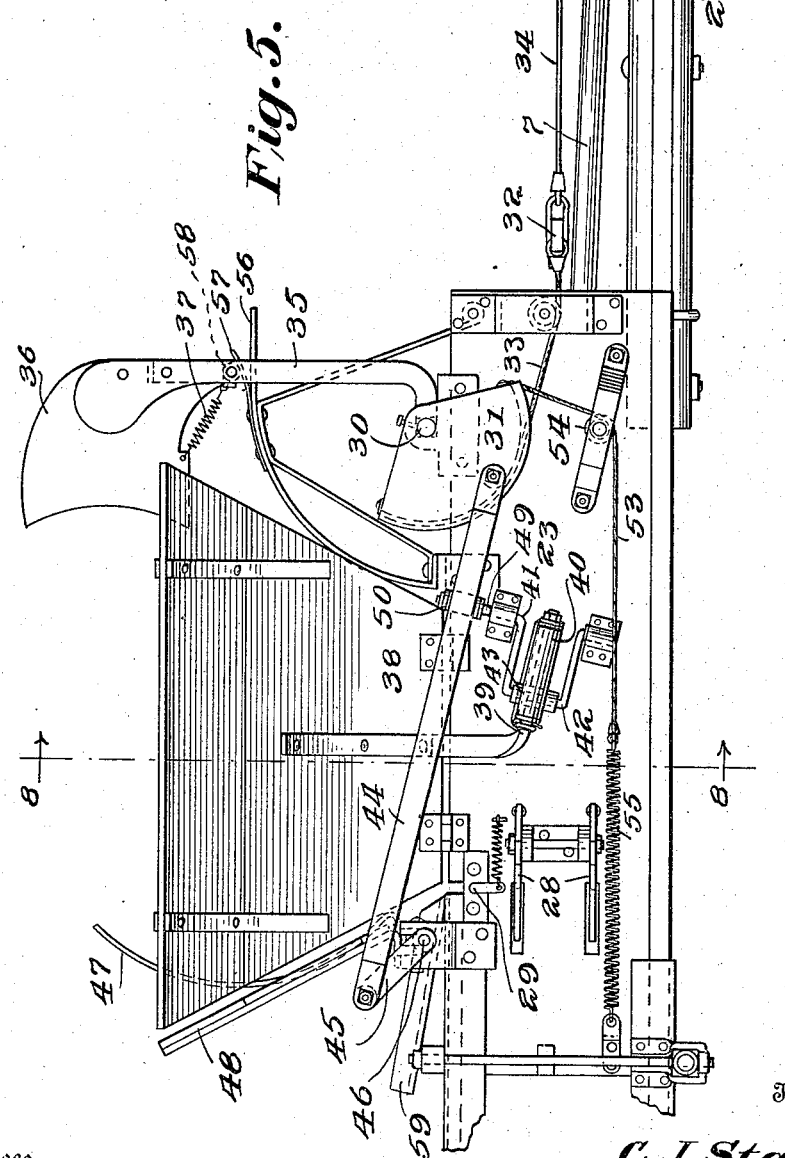

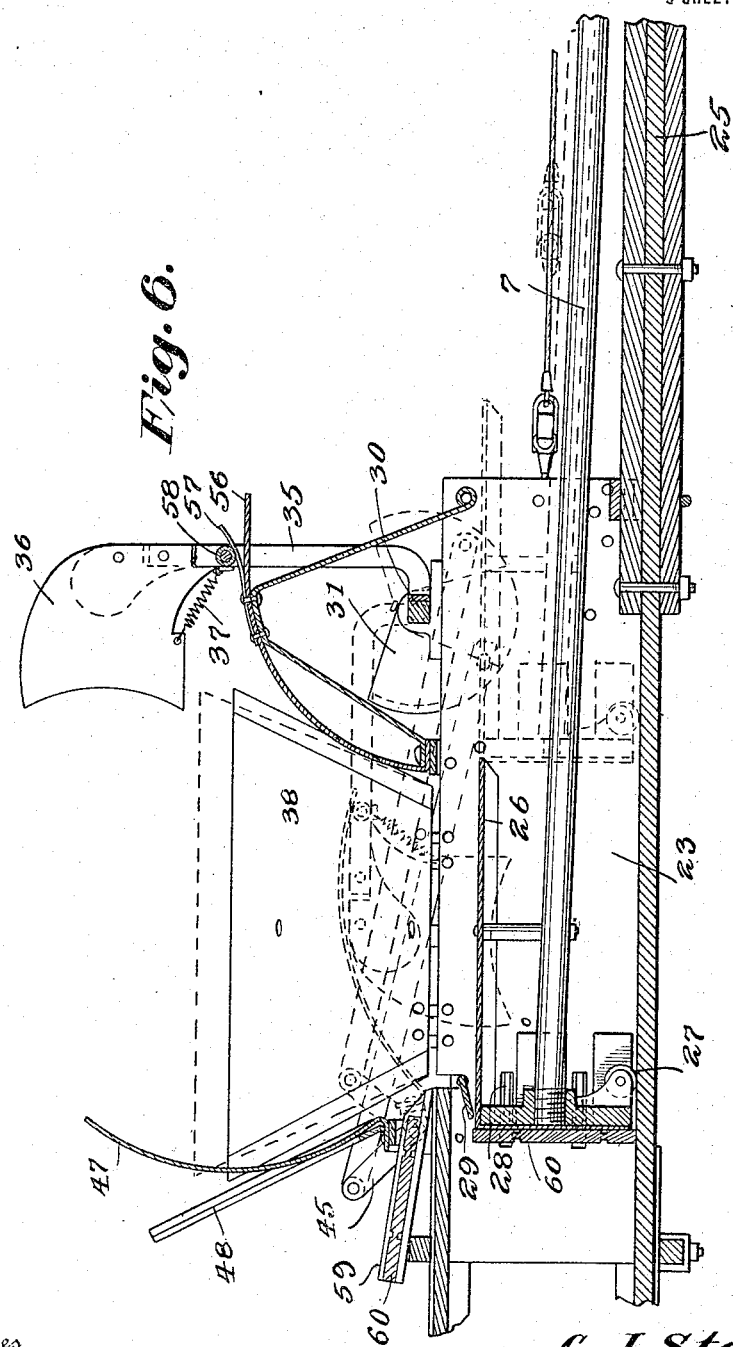

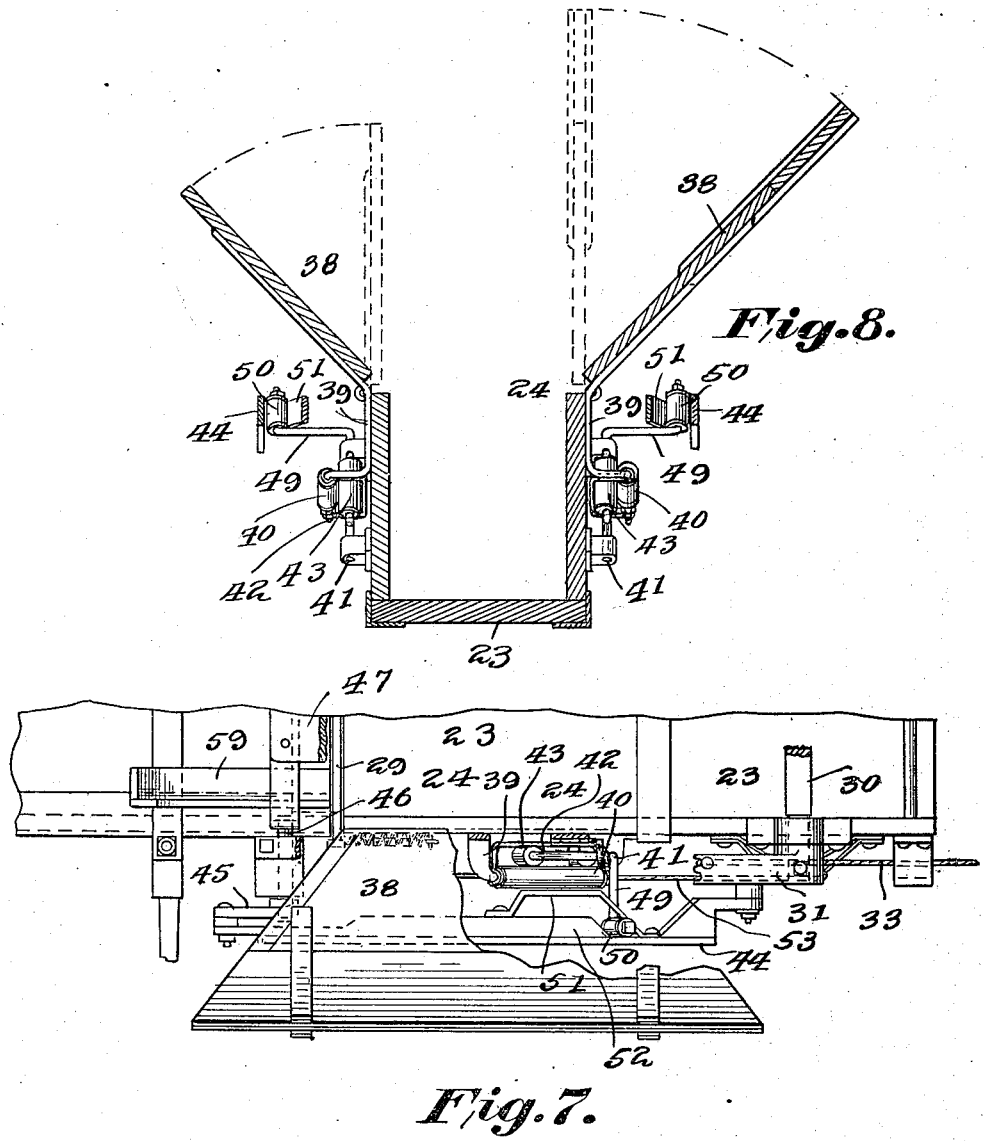

UNITED STATES PATENT OFFICE.

CHRISTIAN J. STARKS, OF MARCO, LOUISIANA.

BALING-PRESS.

1,223,211.  Specification of Letters Patent.  Patented Apr. 17, 1917.

Application filed June 13, 1916. Serial No. 103,509.

*To all whom it may concern:*

Be it known that I, CHRISTIAN J. STARKS, a citizen of the United States, residing at Marco, in the parish of Natchitoches and State of Louisiana, have invented new and useful Improvements in Baling-Presses, of which the following is a specification.

This invention relates to baling presses especially adapted to be used for forming bales of hay and it consists in the novel features hereinafter described and claimed.

An object of the invention is to provide in a press of the character indicated a baling box having a plunger movably mounted therein and a sweep mechanism for operating the plunger.

The said box is provided with an opening through which the hay is introduced into the same and panels are hingedly mounted at the sides of the opening and means are provided for swinging the said panels from an inclined to a vertical position just prior to the forward movement of the plunger in the box.

Another object of the invention is to provide upon the baling box a tamping element adapted to move in unison with the said panels and means for operating the same.

A still further object of the invention is the provision upon the baling box of an arm adapted to enter the opening in the box prior to the forward movement of the plunger, the said arm having spring retained heads pivotally mounted thereon. The heads, the tamping member and the panels all coöperate with each other to assemble and bunch the hay in the box in advance of the plunger whereby the forward movement of the plunger forces the hay into the baling chamber of the press at which place it may be bound or tied in the usual manner.

In the accompanying drawings:—

Fig. 5 is a side elevation of the baling box;

Fig. 6 is a longitudinal sectional view of the same;

Fig. 7 is a fragmentary top plan view of the same;

Fig. 8 is a transverse sectional view of the same cut on the line 8—8 of Fig. 5.

Figure 1:
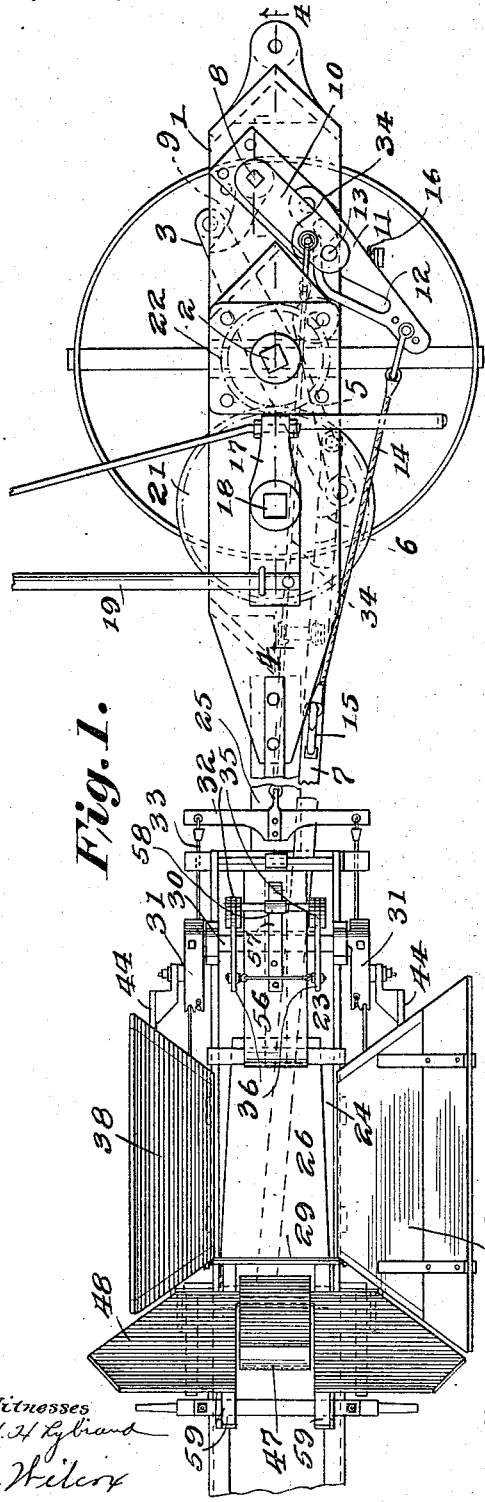
Figure 1 is a top plan view of the press.
Figure 2:
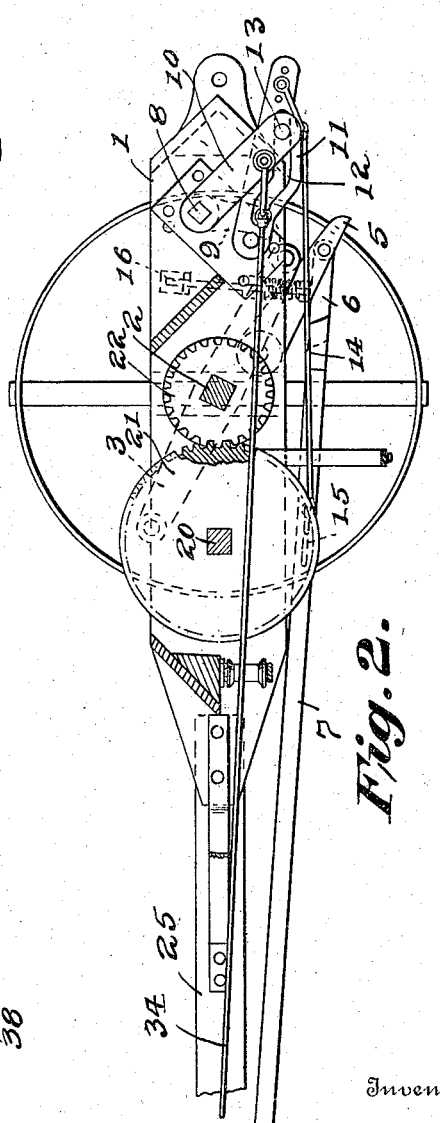
Fig. 2 is a horizontal sectional view of the sweep mechanism cut on the line 2—2 of Fig. 3.

The sweep mechanism of the baling press comprises a frame 1 having a vertically disposed shaft 2 journaled thereon. The said shaft 2 is squared at its upper end as most clearly shown in Fig. 1 of the drawing. An arm 3 is fixed at a point between its ends to the intermediate portion of the shaft 2 and rollers 4 are journaled at the ends of the said arm 3.

An arm 5 is pivoted upon the frame 1 at one side of the shaft 2 and lies in the path of movement of the rollers 4. A head 6 is pivotally connected with the free end portion of the arm 5 and is provided with offset end portions. One end of a plunger rod 7 is attached to the head 6 and the other end of the said rod is attached to a plunger which will be described later. A shaft 8 is journaled upon the frame 1 and carries at its intermediate portion a cam 9 which lies in the path of movement of the rollers 4. An arm 10 is fixed to the upper end of the shaft 8. A link 11 is pivoted upon the frame 1 and is provided with a slot 12 which receives a pin 13 carried by the arm 10. A cable 14 is connected at one end with the free end of the link 11 and at its other end is connected with the rod 7 by means of a bracket 15 mounted upon the said rod.

The arrangement of the parts of the sweep mechanism just described is such that when the shaft 2 is rotated the rollers 4 at the ends of the arm 3 successively engage the cam 9 whereby the shaft 8 is turned and after leaving the cam 9 each roller 4 engages the arm 5 and swings the same upon its pivotal connection with the frame 1. When the roller 4 encounters the cam 9 and turns the shaft 8 the free end of the arm 10 is swung in a direction away from the shaft 2 and the pin 13 moves along the slot 12 and swings the free end of the link 11 away from the shaft 2. This moves the cable 14 longitudinally whereby the rod 7 and the plunger mounted thereon are moved to retracted positions. After the said roller passes beyond the end of the cam 9 it strikes the end portion of the arm 5 and swings the same toward the rod 7 whereby the said rod and plunger carried at the end thereof are moved in a forward direction to effect the compression of the hay as hereinafter described. A buffer 16 is mounted upon the frame 1 and when the rod 7 is retracted as hereinbefore described the arm 5 strikes the said buffer at the end of the movement of the arm thus cushioning the retractive movement of the plunger in the baling box.

Figure 3:
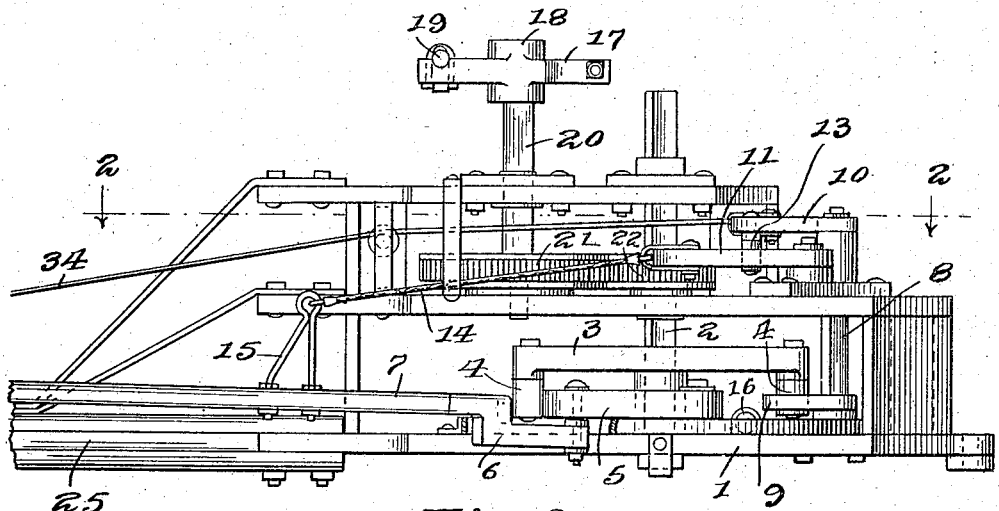
Fig. 3 is a side elevation of the sweep mechanism with parts broken away.
Figure 4:
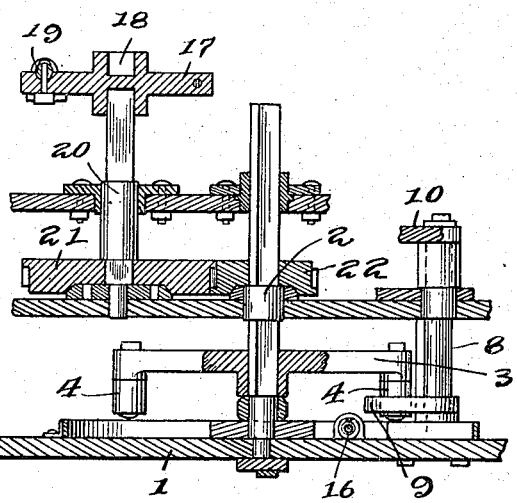
Fig. 4 is a longitudinal sectional view of the same cut on the line 4—4 of Fig. 1.

A head 17 is provided at its opposite sides with sockets 18, one of which may be applied to the upper end of the shaft 2 and a sweep pole 19 is attached to the head 17 and draft animals may be hitched to the said pole in the usual manner. Thus means are provided for rotating the shaft 2 in the frame 1. Under certain conditions it may be necessary or desirable to increase or magnify the power which is applied to the shaft 2 and in this instance a shaft 20 is journaled in the frame 1 and is operatively connected with the shaft 2 by means of intermeshing gear wheels 21 and 22, the wheel 21 being mounted upon the shaft 20 and the wheel 22 upon the shaft 2. The upper end of the shaft 20 is squared and the head 17 may be applied to the said shaft 20 as illustrated in Figs. 1, 3, and 4 of the drawing. When the head 17 is applied to the shaft 20 it is turned over or reversed in its position from that which it occupies when it is applied to the shaft 2 consequently the sockets 18 are provided at the opposite sides of the said head 17.

The baling box 23 is provided at its top side with an opening 24 through which the hay is introduced into the said box. The box 23 is connected with the frame 1 by means of a reach pole 25. A plunger 26 is slidably mounted in the box 23 and is attached to the end of the rod 7. The plunger 26 is mounted upon rollers 27 (one of which is shown in Fig. 6) and the said rollers are adapted to move along the upper surface of the bottom of the box 23 during the reciprocatory movement of the said plunger. Spring pressed retainers 28 are pivotally mounted at the sides of the box 1 and pass through openings therein and are adapted to engage the compressed bunches of hay and prevent the same from expanding during the retractive movement of the plunger. Inasmuch as such retarders are of the usual pattern and operate in the usual manner further description of the same is unnecessary. A spring operated tucker 29 is pivotally mounted in the box 23 at the end of the opening 24 and is adapted to be encountered by the plunger 26 when the same moves in a forward direction whereby the said tucker is swung against the tension of the spring which is connected with the same as is shown in Fig. 5. The said tucker is of conventional form and is adapted to prevent the hay at the end portion of the opening 24 from following the plunger as the same moves in the box. A shaft 30 is journaled upon the top of the box 23 and disks 31 are fixed to the end portions of the said shaft 30. A bar 32 is movably mounted beyond one end of the box 23 and cables 33 are connected at one end with the said bar and at their other ends with the disks 31. A cable 34 is connected at one end with the intermediate portion of the bar 32 and at its other end is connected with the free end portion of the arm 10 as best shown in Fig. 1 of the drawing. An arm 35 is mounted upon the intermediate portion of the shaft 30 and heads 36 are pivotally mounted at the free end portion of the said arm 35. Springs 37 are connected at one end with the heads 36 and at their other ends with the arm 35 as shown in Fig. 5 and the said springs 37 are under tension with a tendency to hold the lower portions of the heads 36 in engagement with the intermediate portion of the arm 35. During the turning movement of the shaft 8 as hereinbefore described the arm 10 moves the cable 34 longitudinally which in turn moves the bar 32 and the cables 33 are moved longitudinally whereby the disks 31 are turned and the shaft 30 is rotated. Consequently the shaft 30 is turned and the arm 35 mounted thereon is swung whereby the heads 36 are swung from the position shown in Fig. 5 down into the box 23 through the top opening 24 thereof. This occurs just in advance of the forward movement of the plunger 26 and in the event that the plunger in its forward movement should strike the heads 36 the said heads will swing upon their pivotal connections with the arm 35 thus permitting the plunger to pass under the heads without breaking any of the parts. When the plunger moves rearwardly in the box 23 the springs 37 draw the heads 36 back to their normal positions with relation to the arm 35. During the downward movement of the heads 36 they encounter the hay which is piled into the opening 24 of the box and force the same down into the box so that the hay is operated upon by the advancing plunger.

Panels 38 are hingedly mounted at the sides of the box 23 and at the edges of the opening 24 in the top thereof and angular arms 39 are attached to the outer sides of the panels 38. Rollers 40 are journaled at the lower portions of the arms 39. Shafts 41 are journaled at the sides of the box 23 and the said shafts are provided at their intermediate portions with cranks 42. Rollers 43 are journaled upon the cranks 42 and are transversely disposed with relation to the rollers 40 and in contact with the same. Bars 44 are pivotally connected at one end with the disks 31 at points eccentric thereof and the said bars 44 are pivotally connected at their other ends with arms 45 mounted upon a shaft 46. The said shaft 46 is journaled upon the box 23 and carries at a point between its ends a tamping member 47 which operates through an opening provided in a wall 48 mounted upon the box 23. As the disks 31 turns as hereinbefore described the bars 44 are moved longitudinally whereby the arms 45 are swung and the shaft 46 is turned. This causes the tamping member 47 to move down into the box 23 through the top opening 24 thereof and the said tamping member 47 coöperates with the heads 36 in forcing the material down into the box in advance of the compression stroke of the plunger 26.

The shafts 41 are provided at their upper ends with cranks 49 upon which rollers 50 are journaled. The said rollers 50 bear against the inner sides of the bars 44. Yokes 51 are located at the inner sides of the bars 44 and extend around the inner portions of the rollers 50. Blocks 52 are mounted at the inner sides of the bars 44 in the paths of movement of the rollers 50. As the bars 44 move longitudinally as hereinbefore described the blocks 52 encounter the rollers 50 whereby the shafts 41 are turned and the rollers 43 journaled at the intermediate portions thereof force the rollers 40 in an outward direction thus swinging the arms 39 and moving the panels 38 from inclined positions to vertical positions as indicated by the dotted lines in Fig. 8 of the drawing. Thus the material which has been previously placed between the said panels is loosely bunched and the said material is forced down into the box 23 through the opening 24 by the action of the heads 36 and the tamping member 47 hereinbefore described.

Cables 53 are attached at one end to the disks 31 and the intermediate portions of the said cables are trained under pulleys 54 journaled at the sides of the box 23. The other ends of the cables 53 are connected with coil springs 55 which in turn are attached to the sides of the box 23.

During the turning movement of the disks 31 as hereinbefore described the cables 53 are moved longitudinally whereby the springs 55 are stretched. When the free end of the arm 10 is moved in a forward direction the cable 34 becomes slack and the tension of the springs 55 comes into play whereby the disks 31 are turned and through the connecting cables 33 and the blocks 52 the cable 34 is maintained in a proper taut condition and the said disks 31 are turned whereby the arm 35 and the tamping member 47 are returned to their normal upright positions as shown in Fig. 5 of the drawing. At the same time the shafts 41 are moved by the yokes 51 attached to the bars 44 whereby the rollers 43 are moved in an inward direction and the panels 38 may swing by gravity to their open or inclined positions as shown in heavy lines in Fig. 8.

A bracket 56 is mounted upon the box 23 and a spring 57 is mounted upon the upper portion of the said bracket. The said spring 57 is provided with an upturned end portion which is located in the path of movement of a roller 58 journaled upon the arm 35 consequently as the said arm approaches the limit of its upward swinging movement the roller 58 moves along the upturned end portion of the spring 57 which serves as a buffer for the said arm and cushions the final movement thereof.

Guides 59 are mounted upon the top of the box 23 and a block 60 is normally held in the said guides 59. The said block 60 may be used as a follow block in conjunction with the plunger 26 in the usual manner to provide a partition between the bales of hay as the same is forced by the action of the plunger into the baling chamber and by the provision of the block 60 which as shown in Fig. 6 is provided at its opposite sides with grooves suitable space is left at the ends of the bales to permit the insertion of a tie wire around the bale for binding the same.

From the foregoing description taken in conjunction with the accompanying drawing it will be seen that a baling press of simple and durable structure is provided and that the parts thereof mutually coöperate with each other to efficiently and promptly supply the loose hay to the compression box of the baling press whereby the said hay may be subsequently acted upon by the plunger during the advance or compression stroke of the same.

Also means are provided for returning the parts to their normal positions after or just prior to the retractive stroke or movement of the plunger.

Having described the invention what is claimed is:—

1. A baling press comprising a box, a plunger movably mounted therein, means for moving the plunger, panels hingedly mounted upon the box, arms attached to the panels and having angularly disposed end portions, shafts journaled upon the box and having cranks located opposite said arms, tamping members mounted upon the box, means operatively connecting said tamping members together and adapted to turn the said shafts and means for operating the said tamping members from the plunger moving means.

2. A baling press comprising a box, a plunger movably mounted therein, means for moving the plunger, panels hingedly mounted upon the box, arms carried by the panels, shafts journaled upon the box and having cranks located opposite said arms, tamping members movably mounted upon the box, bars operatively connecting said tamping members together, yokes and blocks carried by the said bars and adapted to turn the said shafts as the bars are moved and means operatively connecting the tamping members with the means for moving the plunger.

3. A baling press comprising a box, a plunger movably mounted therein, means for moving the plunger, shafts journaled upon the box and provided with cranks, panels hingedly mounted upon the box, arms attached to the panels and having end portions disposed transversely with relation to some of the cranks of the shafts, tamping members movably mounted upon the box, bars operatively connecting the said tamping members together, yokes carried by the bars and receiving other of the cranks of the said shafts and means for operating the tamping members from the means which moves the plunger.

4. A baling press comprising a box, a plunger movably mounted therein, means for moving the plunger, tamping members movably mounted upon the box, means for cushioning the movement of the tamping members, bars operatively connecting the tamping members together, means for moving the tamping members from the means which operates the plunger, yokes carried by the bars, panels hingedly mounted upon the box, arms attached to the panels, shafts journaled upon the box and having cranks, some of the cranks being located opposite the said arms and other of the cranks being located in the said yokes.

In testimony whereof I affix my signature.

CHRISTIAN J. STARKS.

Copies of this patent may be obtained for five cents each, by addressing the "Commissioner of Patents, Washington, D. C."